April 9, 1963 R. O. BROWN 3,084,712
WATER AND LIQUID CHEMICAL MIXING AND MEASURING DEVICE
Filed May 9, 1960 2 Sheets-Sheet 1
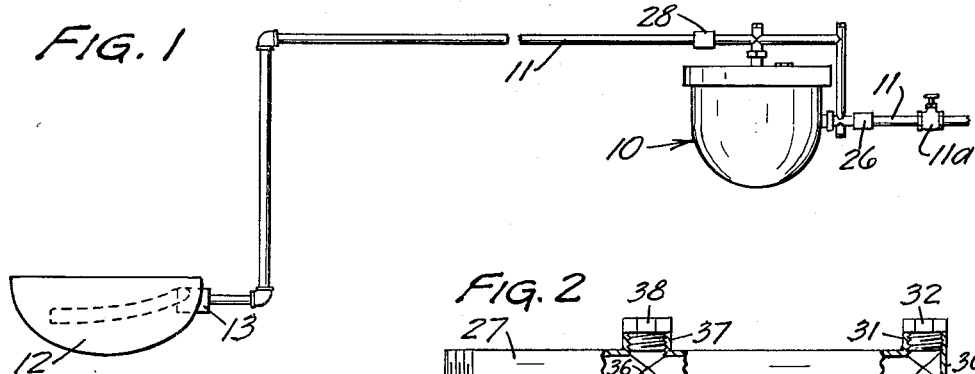
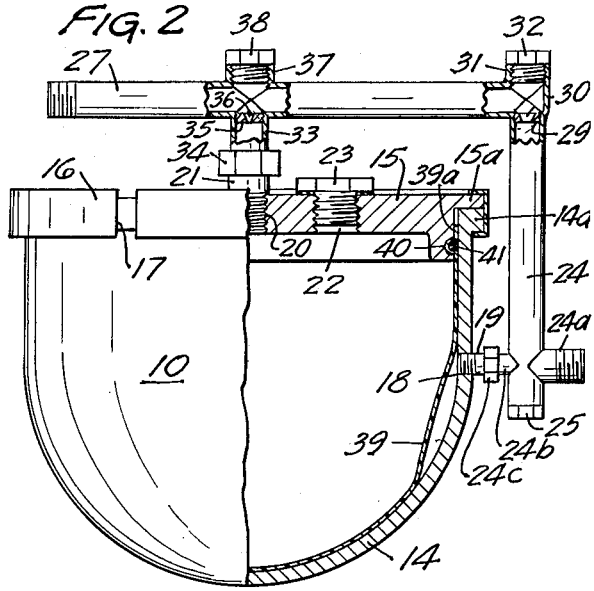
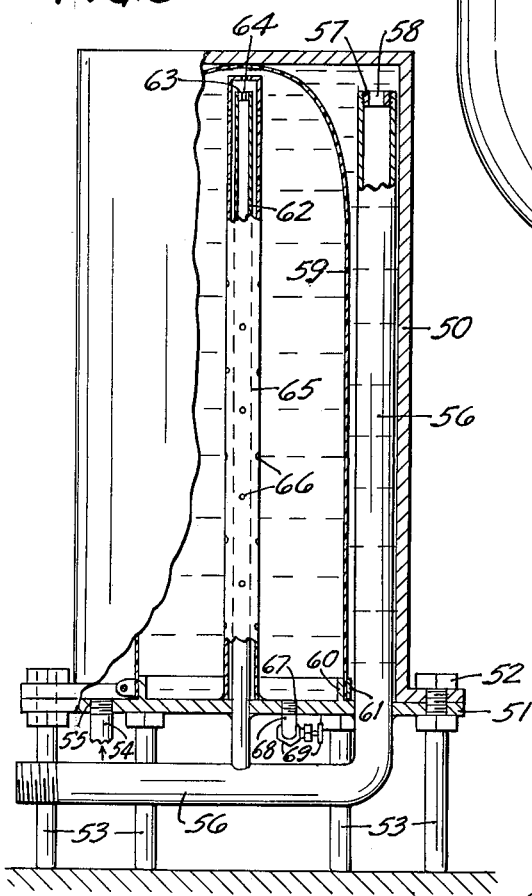
INVENTOR
ROBERT O. BROWN
BY Williamson, Schroeder, Adams & Palmatier
ATTORNEYS April 9, 1963 R. O. BROWN 3,084,712
WATER AND LIQUID CHEMICAL MIXING AND MEASURING DEVICE
Filed May 9, 1960 2 Sheets-Sheet 2

INVENTOR.
ROBERT O. BROWN
BY George F. Williamson &
H. Dale Palmatier
ATTORNEYS

United States Patent Office 3,084,712
Patented Apr. 9, 1963

3,084,712
WATER AND LIQUID CHEMICAL MIXING AND
MEASURING DEVICE
Robert O. Brown, 4500 Morningside Road,
Minneapolis, Minn.
Filed May 9, 1960, Ser. No. 27,975
5 Claims. (Cl. 137—564.5)

This invention relates to apparatus for metering and mixing different liquids in predetermined proportions. This application constitutes a continuation-in-part of my co-pending application Serial Number 702,065, filed December 11, 1957, and entitled Water and Liquid Chemical Mixing and Measuring Device, now abandoned.

An object of the present invention is to provide new and improved apparatus of extremely simple and inexpensive construction and operation for adding liquid chemicals and the like to water in predetermined proportions in relation to the quantity of water flowing.

Another object of my invention is the provision of novel apparatus for readily and easily adding liquid chemicals, drugs and the like in predetermined proportions to flowing water and wherein the apparatus is of maximum reliability and requires a minimum of service because of the absence of moving mechanical parts.

A further object of my invention is the provision of liquid chemical and water measuring and mixing apparatus which is readily refillable with the liquid chemical to assure a continuous supply of the chemical for mixing with the water.

A still further object of my invention is the provision of a liquid chemical and water measuring and mixing apparatus which when used with most chemicals which are heavier than water, is well adapted for use in drinking water supply systems for live stock wherein the flow of water is discontinuous and wherein it is important that under static conditions concentrations of liquid chemical in the water supply lines are to be prevented so that the live stock will not be subjected to drinking quantities of concentrated liquid chemicals.

These and other objects and advantages of my invention will more fully appear from the following description made in connection with the accompanying drawings wherein like reference characters refer to the same parts throughout the several views and in which:

FIG. 1 is a general assembly view showing the liquid chemical and water measuring and mixing apparatus applied to the watering system supplying the water for live stock drinking cups and the like;

FIG. 2 is a detail elevation view, partly in section of the water and liquid chemical measuring and mixing apparatus which comprises the present invention;

FIG. 3 is an elevation view partly in section of a modified form of the apparatus.

Figure 4:
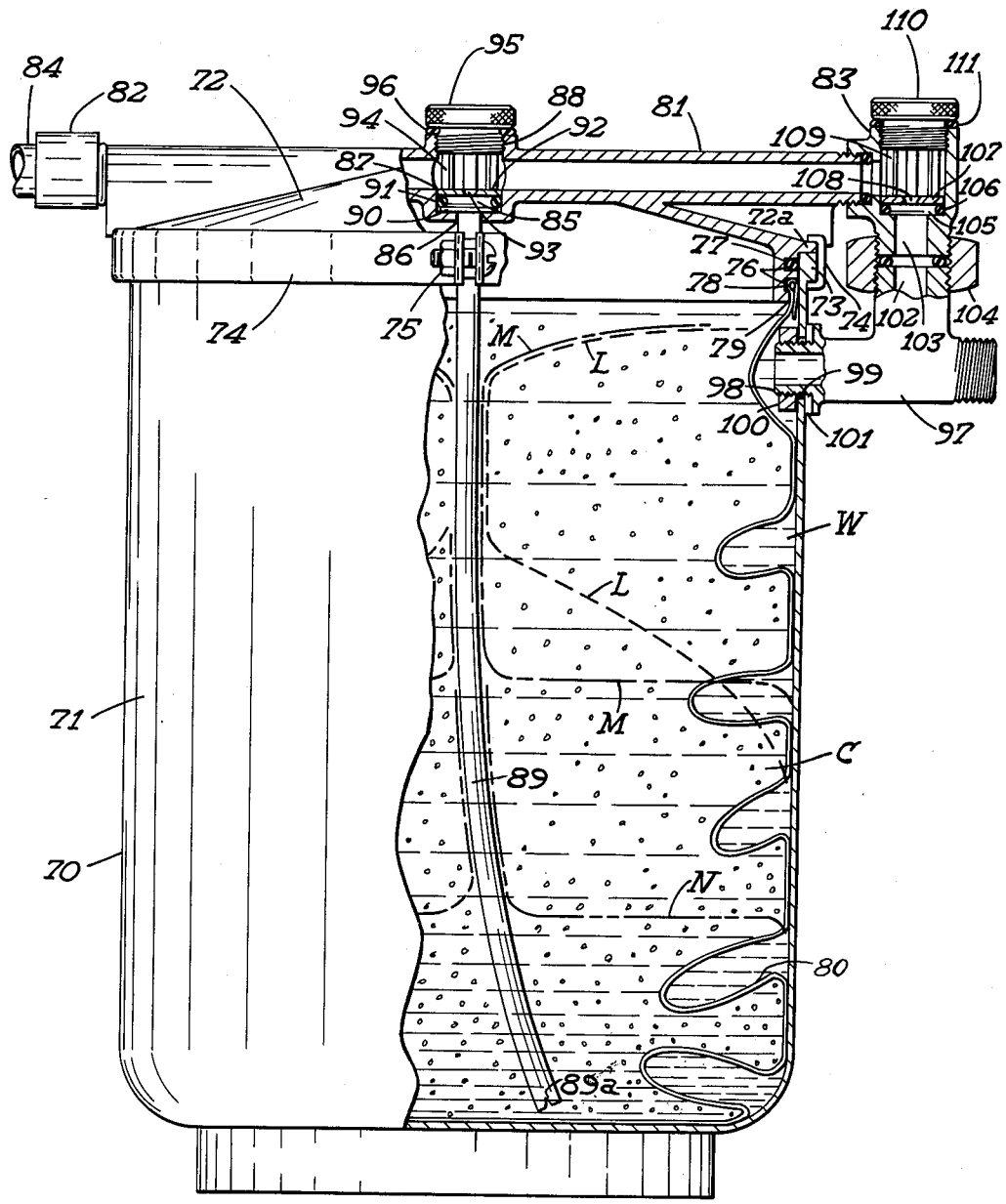
FIG. 4 is an elevation view, partly in section, of a form of the invention different than those shown in FIGS. 2 and 3, but employing some of the same novel features.

As seen in FIG. 1, the liquid chemical and water measuring and mixing apparatus, which is indicated in general by the numeral 10 is connected in the water supply line 11 which will be connected to a source of water under pressure, (not shown) and which discharges water through the livestock drinking cup 12 having suitable valve means 13 for controlling the flow of water.

The liquid chemical metering and mixing apparatus 10 includes a discharge conduit 27, a hollow structure which includes closed receptacle 14, pipe 24 and an interconnecting pipe section which includes T-section 24b, coupling 24c and nipple 19 which is threaded through an aperture 18 in the receptacle. The upper end of pipe 24 is connected to the discharge conduit 27 to provide an outlet for the water flowing through pipe 24. The receptacle 14 has an outlet at the top thereof, through the removable cover 15, and includes the outlet opening 20, nipple 21, coupling 34, and T-section 33 which is in flow communication with the discharge conduit 27. The removable cover 15 has a peripheral flange 15a which rests upon an out-turned peripheral lip 14a at the upper edge of the receptacle sidewall. The flange 15a and the lip 14a are secured together by means of an encompassing ring 16 which is split at 17 to permit removal of the ring and thereby permitting removal of the cover. T-section 24a which is connected to the pipe 24 provides an inlet for water under pressure to the hollow structure, and the T-section 24a may be attached as by coupling 26 to the source of water under pressure. The size of the T-section 24b is such as to provide no material restriction to flow from the inlet pipe 24 to the receptacle so that the fluid pressure within the receptacle is identical to the fluid pressure within the inlet pipe 24.

The lower end of pipe 24 provides a drain which is normally closed by plug 25. The discharge conduit 27 will be coupled to the line 11 and valve 13 by a coupling 28.

Means are provided for producing limited flow and a pressure differential between the pipe 24 and the discharge conduit 27 when water under pressure is supplied to the inlet 24 and in the form shown, such means comprise a disc 29 having an orifice 30 therein. The disc 29 is threaded into the interior of pipe 24 adjacent its upper end and is therefore removable from the pipe 24. An open end section 31 of pipe 24 above the orifice 30 is provided to facilitate removal and replacement of the disc 29 by one having a different size orifice and a closure plug 32 is threadably carried in the section 31 of the pipe 24.

A disc 35 defining an orifice 36 therein is threadably mounted in the pipe section 33 to allow only a restricted flow and to produce a pressure differential between the interior of receptacle 14 and the outlet pipe 27. A second T-section 37 of pipe 27 is provided to facilitate removal of the disc 35 therethrough and a closure plug 38 is normally threaded into the T-section 37.

A water-impervious, flexible, and substantially inelastic membrane or bag 39 of shape and configuration similar to the receptacle 14 is sealed to the interior of the receptacle peripherally around the discharge to contain a quantity of liquid chemical and to prevent flow communication between the aperture 18 and outlet opening 20 of the receptacle. In the form shown, the membrane or bag 39 may be constructed of polyethylene, or in the alternative may be made of a product known by the trademark Saran which is produced and sold by The Dow Chemical Company of Midland, Michigan. Of course the membrane or bag 39 should have a high tensile strength and should have a high resistence to chemicals that might be contained therein.

The cover 15 has an outwardly opening annular groove 40 therein and the upper edge portion 39a of the bag 39 is inserted into the groove 40 and is retained therein by an elastic gasket or O-ring 41 which also bears against the peripheral wall of the receptacle to produce a seal between the cover and the receptacle wall.

In the use and operation of the invention, there will be no mixing of liquid chemicals from the bag 39 with the water when the valve 13 is closed and no water is flowing in the pipe 11. When the water flows under pressure into the pipe 24, the water also exerts fluid pressure on the exterior of the bag 39 so that the fluid pressure within the receptacle is substantially identical to the pressure in the pipe 24. As a result of this pressure on the flowing water, a predetermined volume of water is allowed to flow from the pipe 24 to the discharge conduit 27 by the orifice 30. The fluid pressure exerted against the exterior of bag 39 tends to collapse the bag, equalizing the fluid pressure interiorly and exteriorly of the bag. The fluid pressure on the chemical within the bag causes the fluid chemical to be expelled through the discharge and through the orifice 36 at a predetermined rate. It will be understood that the orifice 36 is substantially smaller than the orifice 30 and therefore, because the pressure applied to the liquid chemical in the bag 39 and to the water in the pipe 24 is identical the flow of water through the orifice 30 will be substantially greater than the flow of liquid chemical through the orifice 36. In one assembly, the orifice 30 may be approximately five-sixteenths of an inch in diameter and the orifice 36 may be approximately one-thirty-second of an inch in diameter and in this situation, the ratio of the volume of water flowing to the volume of liquid chemical being metered and mixed with the water will be approximately one hundred to one. As the water continues to flow, the liquid pressure continues to collapse the bag 39 which will move away from the receptacle sidewall and collapse upwardly toward the opening 20 in the cover. When the supply of liquid chemical in the bag 39 is to be replenished, the valve 11a in the supply line 11 is closed to remove the fluid pressure from the pipe 24 and from the interior of the receptacle. The valve 13 at the drinking cup may be operated to release a portion of the water, and the plug 25 will be removed to allow the water in the receptacle and at the exterior of the bag 39 to drain out. The plug 23 is removed to open the filling opening 22 and an additional supply of liquid chemical may be poured into the bag 39 until the bag has distended to the walls of the receptacle. When the bag is full, the plug 23 is reinserted to close the interior of the receptacle and the plug 25 will also be replaced to cause subsequent flow of water to pass through the pipe 24 and orifice 30. When the valve 11a is again opened, fluid pressure is applied into the pipe 24 and into the receptacle 14 to tend to cause fluid chemical to be discharged through their respective orifices to be expelled through discharge conduit 27. However, if the valve 13 remains closed the pressure in the discharge conduit will substantially immediately be equal to the pressure in the pipe 24 and there will be no flow of water or liquid chemicals.

It will be seen that by disconnecting the couplings 24c and 34 the receptacle may be completely removed, and then the ring 16 may be removed so as to allow the cover 15 to be lifted off the receptacle. The interior of the receptacle may be easily cleaned and the bag 39 may be replaced if necessary by merely lifting the gasket 41 out of the groove 40. Cleaning of the receptacle and replacement of the bag 39 is substantially the extent of necessary servicing of the apparatus which is at all necessary. Of course if the proportion of liquid chemical and water is to be changed one or both of the orifices 30 and 36 may be changed.

In the form of the invention shown in FIG. 3 the receptacle 50 has a bottom cover or base plate 51 and is secured thereto as by bolts 52, and the base plate 51 may have a plurality of legs 53 for supporting the apparatus. The inlet for water under pressure is provided by the pipe 54 which is threaded into an aperture 55 through the base plate 51, and the water has the liquid chemical added thereto in the lower portion of discharge conduit 56 which has a portion extending upwardly through the base plate 51 and has a disc 57 threaded into the upper end thereof and defining an orifice 58 therein. The water-impervious, flexible membrane or bag 59 is oriented in inverted position and the open end thereof encompasses an upwardly projecting annular ring 60 which is affixed to the base plate 51 and is clamped to the ring 60 by means of a removable ring 61. A liquid chemical discharge pipe 62 extends through the base plate 51 and is affixed thereto and the lower end of the pipe 62 is affixed to the discharge conduit 56 and is in flow communication therewith. A removable disc 63 defining an orifice 64 is threaded into the upper end of pipe 62. The orifice 64 is substantially smaller than the orifice 38 and the flow of liquid chemical through the orifice 64 will be materially less than the orifice 58.

Means are provided for preventing collapsing of the bag 59 into engagement with the upper end of pipe 62 which would prevent flow of liquid chemical through orifice 64 and in the form shown, such means comprises a tube 65 which encompasses the pipe 62 and is affixed to the base plate 51 and has a plurality of apertures 66 therein to permit flow of liquid chemical into the tube 65 and upwardly into the orifice 64.

Means are provided for filling the bag 59 with liquid chemicals and in the form shown a filling opening 67 is provided through the base plate 57 inwardly from the annular ring 60, and having a pipe 68 threaded thereinto. A valve or petcock 69 is provided in the pipe 68 to obstruct flow therethrough. When the liquid chemical is to be supplied into the bag 59, the container in which the liquid chemical is supplied will be connected by means of a rubber hose or the like to the pipe 68 and the petcock will be opened. The water pressure at the inlet pipe 54 must necessarily be removed and water will be allowed to flow out through the discharge conduit 56. As the water flows out through the discharge conduit 56, water is removed from the interior of the receptacle 50 and the liquid chemical will be drawn by partial vacuum into the bag 59. When the bag has been filled the petcock will be closed and water pressure is applied at the pipe 54 to produce a fluid pressure in the receptacle 50, causing water to flow through the orifice 58 and causing application of fluid pressure to the bag 59 which cause flow of liquid chemical through the orifice 64 at a predetermined rate, depending upon the size of the orifice 64 in relation to the orifice 58.

The form of the invention shown in FIG. 4 includes a rigid receptacle 70 including a bowl 71 and a removable cover 72. The bowl 71 has an out-turned flange 73 around its top to cooperate with the circumferentially expandable and constrictable channel-shaped cover-retaining band 74 which is normally held together by a bolt and nut 75 so that the cover rim 72a is clamped securely against the top of the bowl 71. The cover 72 has a pair of annular grooves 76 in the periphery thereof, and the uppermost groove has a sealing ring 77 therein directly engaging the inner periphery of the bowl 70, and the lower groove 76 normally carries a sealing ring 78 which overlies and grips the upper peripheral edge portion 79 of a flexible membrane or bag 80 constructed of material similar to the bag 39 previously described in connection with FIG. 2. It will be noted that the bag 80 is somewhat larger in size than the internal dimensions or volume of the bowl 70 and that the substantial quantity of excess sheet material of the bag 80 will allow for substantial deformation of the shape of the bag in the bowl without causing the weight of the liquid chemical therein to cause additional pressures to be exerted on the chemical in the bag due to the assumption by the bag of various shapes.

The cover 72, being molded of plastic material has a discharge conduit 81 formed integrally thereof and oriented substantially across a diameter of the cover. The opposite ends of the discharge conduit 81 are threaded to receive fittings 82 and 83. The fitting 82 is merely a coupling to connect the discharge conduit to the water and fluid chemical mixture supply conduit 84, which corresponds to the conduit 11 in FIG. 1. The cover 72 provides an outlet 85 from the interior of the receptacle 70 into the discharge conduit 85. An aperture 86 extends through the cover wall and communicates with a recess portion 87 which is aligned with a threaded opening 88 in the top of the discharge conduit. The fluid chemical is supplied to the outlet 85 through a flexible tube 89 constructed of material resistant to action of the chemicals to be contained in the bag 80. The tube 89 has an outturned flange 90 affixed to the upper end thereof and seated in the recess 87. A sealing ring or gasket 91 overlies the flange 90 and engages the circumferential wall of the recess 87, and a disc 92 having an aperture 93 in the center thereof of predetermined size defines an orifice in the outlet for metering of fluid chemical. The disc 92 overlies sealing gasket 91 and is urged downwardly by a plurality of fingers 94 which engage the disc adjacent its periphery and in spaced relation from the aperture 93 at arcuately spaced positions. The fingers 94 are affixed to a threaded cap 95 which is normally threaded into the opening 88, but is removable therefrom to permit removal of the disc 92 so that the bag may be refilled and so that the disc might be replaced with a different disc. During filling of the bag, the tube 89 is also preferably lifted out. A conventional sealing gasket 96 is provided between the cap and the boss portion defining an opening 88.

It will be noted that the tube 89 extends almost to the bottom of the bowl 70 and has a pair of V-shaped notches 89a therein.

The T-fitting 97 comprises a water supply conduit, attachable to a source of water supply such as by coupling 26 in FIG. 1, and the threaded end portion 98 of the T-fitting which projects through the aperture 99 in the wall of bowl 71 and is held therein by nut 100 and sealed to the bowl wall by gasket 101, provides an inlet from the water supply into the receptacle which has no material restriction to flow of water therethrough. It will be noted that the inlet supplies water into the receptacle 70 at the exterior of the bag 80. The upper end portion 102 of fitting 97 and the lower portion 103 of fitting 83 are secured together by a coupling nut 104 to define an outlet from the water supply into the discharge conduit. The interior of fitting 83 has a shoulder surface 105 upon which is seated an annular sealing gasket 106 which supports the periphery of disc 107 having a central aperture 108 to define a water orifice. It will be noted that the aperture 108 is substantially larger than the aperture 93, and this relationship is determined by the relative volumes of water and fluid chemical desired to flow. The disc 107 is held down against the sealing ring 106 by a plurality of spaced fingers 109 engaging the disc periphery and being mounted on a removable cap 110 which is threaded into the fitting 83 and sealed therein by gasket 111.

In operation, during normal flow of water under pressure to supply the demand, such as at drinking cup 12 in FIG. 1, the flow of water will greatly exceed the flow of liquid chemical. The pressure in the fitting 97 or supply conduit is identical to the pressure in the inlet of the receptacle 70 and in the outlet 85. It will be seen that the orifices 108 and 93 are at the same elevation and therefore the fluid pressures at the upstream side of both orifices is identical. The fluid pressures at the downstream sides of the orifices is also identical. The volume of flow through the orifices is in relation to the relative sizes of the orifices.

As the supply of liquid chemical C in the bag is partially depleted, the bag flexes so that the volume in the bag corresponds to the actual volume of chemical C remaining, and the water W will occupy the remainder of the space so as to at all times maintain a condition of pressure equilibrium inside and outside of the bag.

The excess size of the bag as compared to the size of the receptacle bowl is particularly important because most of the fluid chemicals are at least slightly heavier than water. As the quantity of liquid chemical in the bag is depleted, the bag will assume a shape approximated by the dotted line L shown in FIG. 4. There is a tendency for the bag to pinch its upper portion closed, and therefore the tube 89 must necessarily be of at least semi-rigid construction and in the present form the tube 89 is of heavy polyethylene which is somewhat flexible but may not be collapsed. In order that the bag can take the position shown by the dotted line L and still follow the contour of the bowl 71 at the bottom thereof, it will be seen that the size of the bag must be substantially in excess of the size of the bowl, particularly if the bag is non-stretchable as in the instant case, and particularly in view of the undesirability of causing any pressure to be exerted on the fluid chemical by the deformation of the shape of the bag. The condition shown by the dotted line L is presumed to be one of continuing operation of the system so that fluid chemical and water are being discharged through the pipe 84.

When the flow of liquid through the pipe 84 is stopped, the flow of water through the orifice is, of course, stopped, and the entire portion of the system shown in FIG. 4 assumes substantially equal pressures, the fluid chemical being heavier than water, will flow downwardly from the outlet 85 and through the tube 89, and the fluid chemical in the bag 80 will become substantially leveled, causing additional deformation of the bag to approximate the shape shown by the dot-dash line indicated by letter M in FIG. 4. The level of liquid chemical in the tube 89 will be substantially that of the level of the chemical in the bag and a column of water will be disposed in the tube 89 above the liquid chemical. It will be understood that in the position of the bag indicated by the dot-dash line M, a portion of the bag will be puckered around the upper portion of the tube 89.

If substantially lesser quantities of chemical remain in the bag, the bag will, under static conditions with flow stopped, assume approximately the shape shown by the dot-dash line N.

When, after the system has been in static condition and the bag has assumed the shape shown by dot-dash line N, the flow of water and liquid chemical through the pipe 84 is again permitted, the pressure in the discharge conduit 81 is immediately dropped and flow of fluid commences through the orifices in the fashion hereinbefore described. The small column of water extending in the tube 89 is quickly discharged and the liquid chemical will thereafter be added to the water flowing from the orifice 108.

It is to be noted that in the present construction, as in the forms shown in FIGS. 2 and 3 at the comparable locations, there is no material restriction to flow in the supply conduit and inlet to the receptacle from the source of supply of the water; there is no material restriction to flow between the source of supply of water and the upstream side of orifice 108; there is no material restriction to flow between the interior of the bag and the upstream side of orifice 93; and there is no material restriction to flow through the discharge conduit 81 and between the fingers 109 and 94 respectively. Furthermore, the bag 80 will flex and change its shape with no material loss in head or pressure.

It will be seen that I have provided a new and improved liquid chemical and water metering and mixing apparatus which is extremely simple in construction and operation and may be easily serviced and maintained by a person of only a minimum of mechanical ability because the apparatus contains virtually no moving parts.

It will, of course, be understood that various changes may be made in the form, details, arrangement and proportions of the parts without departing from the scope of my invention which consists of the matter shown and described herein and set forth in the appended claims.

What I claim is:

1. Apparatus for adding to water flowing under pressure liquid chemical which is heavier than water, said apparatus comprising a discharge conduit having flow-interrupting means therein, a water supply conduit to be attached to a source of water under pressure, a flexible bag to confine a quantity of liquid chemical, liquid-confining means connected with the supply conduit and causing the source of pressure to be applied against the exterior of the bag and also defining a water outlet connected with the discharge conduit, said means including a rigid and closed receptacle having a bottom supporting the chemical in the bag, mechanism securing and sealing the open end of the bag against the receptacle, means defining a chemical outlet connected with the discharge conduit, and said chemical outlet having a chemical-receiving end at the top of the bag, an impervious and open-ended tube communicating with the chemical-receiving end of the outlet and extending downwardly to the bottom of the bag, and having an opening adjacent the bottom of the bag to receive liquid chemical, a chemical orifice in the chemical outlet, a water orifice in the water outlet and being substantially larger than said chemical orifice.

2. Apparatus for adding liquid chemical heavier than water to water flowing under pressure, comprising a discharge conduit with flow-interrupting means therein, a water supply conduit for water under pressure, a closed and rigid receptacle, a water inlet communicating between the supply conduit and the interior of the receptacle, a liquid chemical-confining bag in the receptacle and having its open end sealed to the top of the receptacle, the bottom of the bag and chemical therein being supported by the bottom of the receptacle, the top of the receptacle having a chemical outlet disposed within the periphery of the end of the bag and communicating with the discharge conduit, a chemical metering orifice in the chemical outlet, an impervious and open-ended chemical supply tube connected with the outlet and extending into the bag and to the lower end thereof, a water outlet connecting the supply conduit to the discharge conduit, and a water metering orifice in the water outlet.

3. Apparatus for adding liquid chemical to water flowing under pressure, comprising a discharge conduit, a water supply conduit for water under pressure, a closed and rigid receptacle, a water inlet communicating between the supply conduit and the interior of the receptacle, a liquid chemical-confining bag in the receptacle and having its open end sealed to the top of the receptacle, the bottom of the bag and chemical therein being supported by the bottom of the receptacle, the top of the receptacle having a chemical outlet disposed within the periphery of the end of the bag and communicating with the discharge conduit, a chemical metering orifice in the chemical outlet, an impervious and open-ended chemical supply tube connected with the outlet and extending into the bag and to the lower end thereof, said bag being substantially larger than the interior of the receptacle to permit deformation of the bag and puckering of the bag around the tube as the supply of liquid chemical is depleted, a water outlet connecting the supply conduit to the discharge conduit and a water metering orifice in the water outlet and being substantially larger than said chemical-metering orifice.

4. Apparatus for adding to water flowing under pressure, liquid chemical which is heavier than water, said apparatus comprising a discharge conduit, a water supply conduit for water under pressure, a closed and rigid receptacle, a water inlet communicating between the supply conduit and the interior of the receptacle, a liquid-chemical-confining bag in the receptacle and having its open end sealed to the top of the receptacle, the bottom of the bag and chemical therein being supported by the bottom of the receptacle, the top of the receptacle having a chemical outlet disposed within the periphery of the end of the bag and communicating with the discharge conduit, the top of the receptacle having an annular shoulder surface in the outlet, the top of the receptacle also having an opening to the exterior disposed above said shoulder surface, an impervious and open-ended chemical supply tube in the receptacle and having a lower end extending to the lower end of the bag, sad tube also having an upper end extending into the outlet, said upper end having a flange thereon seated on said shoulder surface and supporting the tube, a disc overlying said flange in the outlet and said disc having an orifice opening in flow communication with the tube, and a removable cap in said opening and having depending fingers bearing against said disc and around the disc and flange in the outlet, a water outlet connecting the supply conduit to the discharge conduit and a water-metering orifice in the water outlet.

5. Apparatus for adding liquid chemical, drugs and the like to water under pressure, comprising a discharge conduit, a hollow structure including a first pipe having a first outlet in flow communication with the discharge conduit, said structure also including a closed receptacle having a lower bowl and an upper cover with a depending peripheral lip telescoping into the bowl, said lip having a peripheral recess therein and facing outwardly toward the bowl, releasable means securing the cover to the bowl, a second outlet in the cover of the receptacle and in flow communication with the discharge conduit, said pipe having an inlet for water under pressure, first and second liquid metering orifices each disposed in a corresponding outlet and each having a down-stream side and an up-stream side, said first orifice being substantially larger than said second orifice, a liquid impervious collapsible bag in the receptacle to contain a quantity of liquid chemical, said bag having an upper periphery surrounding the lip of the cover, en endless resilient gasket overlying the bag periphery and lying in the recess of said peripheral lip to seal the bag to the cover, said gasket also sealing against the bowl, the liquid pressure against the exterior of the bag being substantially identical to the liquid pressure at the up-stream side of said second orifice, a second pipe interconnecting said first pipe with said closed receptacle, one of said pipes having a releasable coupling therein, said pipes being of such size as to provide no material restriction to flow so that the fluid pressure at the up-stream side of the first orifice and at the exterior of the bag are substantially identical, whereby the volume of liquid chemical flow into the discharge conduit is controlled by the volume of the liquid flowing through the first orifice.

References Cited in the file of this patent

UNITED STATES PATENTS

| | | |
|---|---|---|
| 1,574,183 | Bodfish | Feb. 23, 1926 |
| 1,754,710 | Davenport | Apr. 15, 1930 |
| 2,571,424 | Dailey | Oct. 16, 1951 |
| 2,618,510 | Mills | Nov. 18, 1952 |
| 2,714,963 | Lester | Aug. 9, 1955 |
| 2,814,253 | Pleuger | Nov. 26, 1957 |